United States Patent

Hamada

Patent Number: 5,217,801
Date of Patent: Jun. 8, 1993

[54] RUBBER COMPOSITE MATERIAL MIXED WITH SHORT STAPLE REINFORCING FIBERS AND METHOD OF MANUFACTURING THE SAME

[75] Inventor: Takashi Hamada, Kakogawa, Japan

[73] Assignee: Mitsuboshi Belting Ltd., Kobe, Japan

[21] Appl. No.: 718,245

[22] Filed: Jun. 20, 1991

[30] Foreign Application Priority Data

Jun. 21, 1990 [JP] Japan ............... 2-164448

[51] Int. Cl.$^5$ .............. B32B 25/04; B32B 25/12; B05D 1/18; B05D 3/12
[52] U.S. Cl. ..................... 428/295; 427/359; 427/365; 427/385.5; 428/492; 428/493
[58] Field of Search ............... 428/295, 492, 493; 524/35; 523/206; 427/359, 365, 385.5

[56] References Cited

U.S. PATENT DOCUMENTS

| | | | |
|---|---|---|---|
| 4,125,493 | 11/1978 | Posiviata et al. | 524/35 |
| 4,127,039 | 11/1978 | Hollaway, Jr. | 428/295 X |
| 4,244,847 | 1/1981 | Posiviata et al. | 523/206 |
| 4,346,140 | 8/1982 | Carlson et al. | 428/290 X |

Primary Examiner—Thomas J. Herbert, Jr.
Attorney, Agent, or Firm—Wood, Phillips, VanSanten, Hoffman & Ertel

[57] ABSTRACT

A composite material, suitable for use in a power transmission belt, having a rubber matrix and a plurality of short staple reinforcing fibers therein of methaphenyleneiso-phthalamide coated with one of a rubber latex and a rubber paste. The invention is also directed to a method of forming the composite material.

27 Claims, 2 Drawing Sheets

RUBBER COMPOSITE MATERIAL MIXED WITH SHORT STAPLE REINFORCING FIBERS AND METHOD OF MANUFACTURING THE SAME

BACKGROUND OF THE INVENTION

1. Field of the Invention

This invention relates to rubber composite material as used in the formation of power transmission belts and, more particularly, to a rubber composite material with short, staple, reinforcing fibers of methaphenyleneisophthalamide uniformly dispersed in a rubber matrix. The invention is also directed to a method of manufacturing the composite material.

2. Background Art

Heretofore, to enhance the resistance of rubber to wear and compression, staple, reinforcing fibers have been dispersed in the rubber. It is known, for example, to uniformly distribute inorganic or organic, short, staple, reinforcing fibers in natural or synthetic matrix rubber. Commonly, the fibers have lengths of between 1 to 50 mm and make up 1 to 30 percent of the volume of the composite rubber material. The fibers are generally oriented in substantially parallel relationship and disposed with their lengths at an angle of from 20°-160°, and preferably 90°, to the frictional surface of the composite material, i.e. The side surfaces of a transmission belt.

The fiber-filled rubber material has, in recent years, been particularly adaptable for use in V-ribbed belts in the automotive industry The automotive environment is particularly demanding on V-ribbed belts, particularly when such belts are used in serpentine drive systems. The engine compartments in today's automobiles are quite compact and, with the engine operating, the temperature in the compartment is elevated to high temperatures. In this environment, and particularly with high horse power engines, it is essential that the V-ribbed belts exhibit high resistance to heat, bending, tension and wear. To meet these demands, designers of prior art transmission belt systems have commonly utilized aromatic polyamide fibers to reinforce the rubber and particularly to give the rubber greater resistance to heat and more rigidity.

It is also known to improve the composite rubber material performance, and particularly the tensile strength and resistance to tearing, by adhering to the short, staple, reinforcing fibers, embedded in the matrix rubber, resorcin-formalin-rubber latex (RFL), isocyanate, and epoxy resin adhesive. While this treatment improves the performance of the rubber, the application of the adhesive by conventional techniques requires use of relatively expensive equipment and is a relatively time consuming, complicated and costly process. An additional problem is that the longevity of the belt may be dependant upon the survival of the adhesive, which time period may be shorter than desired. Further, it is difficult to uniformly adhesively treat the fibers, which may result in unpredictable belt performance, from one belt to the next.

In composite rubber material having a rubber matrix with short staple reinforcing fibers therein, it is desirable, for the optimum belt performance, to use fine fibers. That is, the fibers take up space in the rubber matrix and, if they are too large, they significantly alter the belt characterisitics. The fibers are significantly larger than other additives in the matrix material, such as carbon particles, and it is thus important that their size be controlled. In the absence of the fibers being RFL treated, to prevent fibrillating of the filaments, the filaments are generally dipped in water, cut to length, and then dried. This treatment tends to undesirably entangle and expand the fibers to have an effectively larger diameter.

Another problem with the formation of prior art belts incorporating composite material with dispersed fibers in a rubber matrix is that the fibers commonly become and remain entangled with each other. During manufacture, the cut yarns, in an entangled state, are kneaded with the rubber. During the kneading process, the yarns do not untangle The tangled lumps of yarn remain intact in the end product, which detracts from the integrity of the end product. Certain parts of the rubber matrix have less fibers dispersed therein than desired, while other parts of the matrix material have clumps of tangled fibers which are not oriented as would produce the best quality belt.

One solution to this problem is to repetitively knead the composite mixture. While this eliminates some of the fiber tangling, the kneading may also undesirably alter the characteristics of the fibers and/or rubber matrix.

SUMMARY OF THE INVENTION

The present invention is directed to a rubber composite material having a rubber matrix and a plurality of short staple reinforcing fibers of methaphenyleneisophthlalamide dispersed in the rubber matrix.

It has been found, through extensive testing, that composite rubber material with staple fibers dispersed therein made from methaphenyleneiso-phthalamide exhibits excellent resistance to heat, bending, high load, and wear. Suitable fibers with this composition are sold under the trademark Cornex. In addition, these characteristics are realized without having to subject the fibers to an adhesive treatment, which is conventionally carried out in a relatively time consuming and expensive process using expensive equipment. Cornex fibers have irregular surfaces, with peaks and valleys, as compared to other synthetic fibers such as 6,6 nylon, 6 nylon, polyester, polyvinyl alcohol fiber sold under the trademark VINYLON, and the like, which have relatively smooth cylindrical outer surfaces. The CONEX fibers tend to lock in the matrix rubber, obviating the need for adhesive treatment required with other types of synthetic fibers.

It is common, to prepare conventional aromatic fibers for dispersion in a matrix, to dip the fibers in water. This often results in the fibers entangling, which prevents uniform dispersion in the rubber matrix. The water dipping step is unnecessary according to the present invention and, therefore tangling of the fibers is minimized to thereby permit more uniform dispersion of the fibers in the rubber matrix, which accounts for more consistency of belt performance, from one to the next, and higher integrity belts. At the same time, manufacturing is simplified and the costs attendant thereto are reduced. Further, the need for repetitive kneading is avoided so that the characteristics of the fibers and matrix rubber are not altered detrimentally.

In one form of composite material, the reinforcing fibers are coated with one of a rubber latex and a rubber paste. The one of the rubber latex and rubber paste and the rubber matrix can be the same or different materials.

In one form, the one of the rubber latex and rubber paste is provided in an amount from 1 to 10 weight percent with respect to the amount of reinforcing fibers.

The rubber latex is preferably at least one of styrene-butadiene copolymer rubber latex, natural rubber latex, vinylpyridine-styrene-butadiene-terpolymer latex, nitrilebutadiene latex, and chloroprene latex.

The rubber in the rubber paste is preferably at least one of natural rubber, chloroprene rubber, styrenebutadiene copolymer rubber, acrylonitrile-butadiene copolymer rubber, polysulfide rubber, isobutylene polymer rubber, alkylacrylate-chloroalkylvinyl-ether copolymer rubber, and chlorosulfonated polyolefin rubber.

Preferably the rubber paste is made by mixing rubber with a solvent that is at least one of toluene, xylene, and methylethylketone.

In a preferred form, the reinforcing fibers are present in the amount of 5-50 parts per 100 parts by weight, and preferably 10-30 parts per 100 parts by weight, of the rubber matrix.

The present invention also comprehends an improved power transmission belt of the type having a tension section, a compression section, and a load carrying section, wherein the improvement resides in the provision of the above composite material in at least part of the compression section of the belt.

It is another object of the invention to provide a method of manufacturing a rubber composite material that provides excellent dispersion of short staple reinforcing fibers in a rubber matrix, without the need to adhesive treat the individual fibers.

More particularly, the present invention is directed to a method of manufacturing a rubber composite material consisting of the steps of coating reinforcing fibers of methaphenyleneiso-phthalamide with at least one of rubber latex and rubber paste and mixing the coated reinforcing fibers in a rubber matrix material.

In one form of the method, the reinforcing fibers are coated by dipping the reinforcing fibers in at least one of rubber latex and rubber paste.

One form of the method includes the step of controlling the amount of the at least one of the rubber latex and rubber paste on the reinforcing fibers after the reinforcing fibers are dipped in the at least one of the rubber latex and rubber paste.

The invention further includes the step of drying the coated reinforcing fibers before mixing the reinforcing fibers in the rubber matrix material.

The inventive method further includes the steps of providing a first predetermined length of methaphenyleneiso-phthalamide reinforcing fiber, coating the first length of reinforcing fiber, and cutting the first length of reinforcing fiber after coating into a plurality of short, staple, reinforcing fibers. Preferably, the short, staple, reinforcing fibers have a length of between 1-50 millimeters.

The invention still further comprehends a method of manufacturing a rubber composite material consisting of the steps of providing a fiber of methaphenyleneiso-phthalamide having a first predetermined length, dipping the first length of fiber in at least one of a rubber latex and rubber paste, controlling the amount of the one of the rubber latex and rubber paste on the first fiber length, cutting the dipped first fiber length into a plurality of short staple reinforcing fibers, drying the short staple reinforcing fibers, and mixing the dried short staple reinforcing fibers in a rubber matrix material.

In one form of the invention, the controlling step is carried out by compressing the first fiber length between a cooperating pair of rollers. Preferably, this step is carried out so that the one of the rubber latex and rubber paste is present in an amount between 1-10 weight percent with respect to the amount of short staple reinforcing fibers.

The invention also contemplates the step of incorporating the matrix material produced by the above method into a power transmission belt.

BRIEF DESCRIPTION F THE DRAWINGS

DETAILED DESCRIPTION OF THE DRAWINGS

Figure 1:
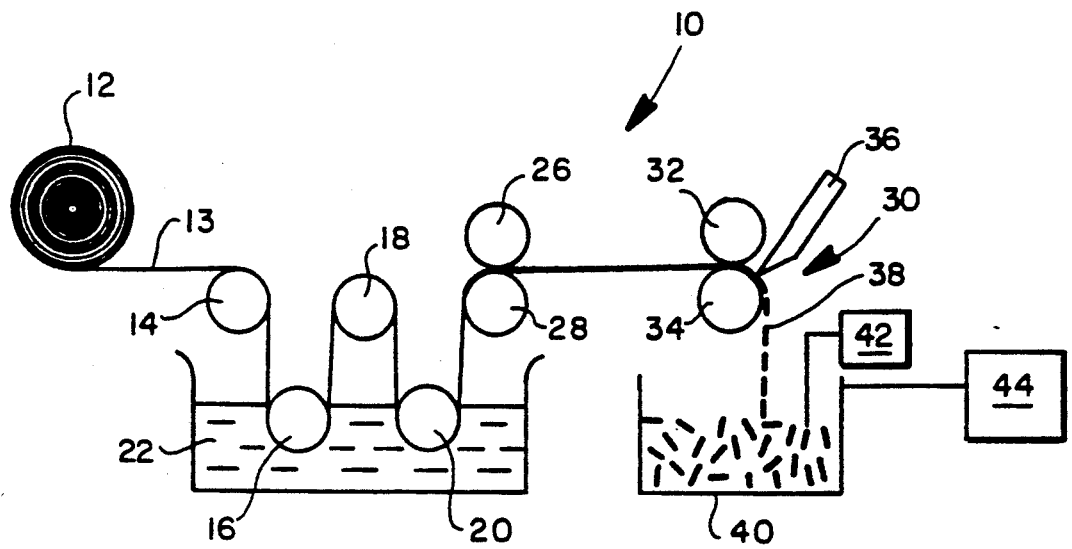
FIG. 1 is a schematic, side elevation view of a system for manufacturing rubber composite material according to the present invention.

In FIG. 1, a manufacturing system is shown at 10 for producing a rubber composite material, according to the present invention. The rubber composite material consists of a rubber matrix with short staple reinforcing fibers therein and is usable in different environments while being particularly adaptable for use in power transmission belts.

The present invention contemplates the use of reinforcing fiber made of methaphenyleneiso-phthalamide, which is an aromatic polyamide fiber. A preferred form of this fiber is sold commercially under the trademark CONEX. Through the system 10, the methaphyleneisophthalamide fibers are treated to facilitate uniform dispersion in a rubber matrix. More specifically, a roll 12 of methaphyleneiso-phthalamide fiber yarn 13 is provided and is continuously fed consecutively around guide rollers 14, 16, 18, 20 to be immersed in a supply of processing liquid 22. The processing liquid 22 is one of rubber latex and rubber paste which may be the same as or different than the rubber making up the matrix material in which the methaphyleneisophthalamide fibers are to be dispersed. The yarn 13 extends downwardly around guide roller 14 and into the liquid supply 22 around roller 16, which is partially immersed in the liquid 22. The yarn 13 passes upwardly around guide roller 18 and back downwardly around partially immersed guide roller 20. By this arrangement, the yarn 13 is twice-dipped into the processing liquid 22.

After the yarn 13 is dipped in the processing liquid 22, the yarn 13 is passed between a cooperating pair of squeeze rollers 26,28, which control the amount of processing liquid 22 which is adhered to the fiber 24. The pressure between the rollers 26,28 is set so that the processing liquid 22 is adhered in the amount of 1-10 weight percent with respect to the weight of the yarn 13.

Downstream of the squeeze rollers 26,28 the yarn 13 is severed at a cutting station 30. At the cutting station 30, a pair of guide rollers 32,34 are provided between which the yarn 13 is drawn. The lower guide roller 34 acts as a backing surface for a cutting blade 36 which is directed downwardly to sever the advancing yarn 13 at preselected intervals to define individual, short staple reinforcing fibers 38, generally between 1-50 mm in length, which fall down into and are collected in a container 40. Alternatively, a roll cutter could be employed. The aspect ratio of the short staple fibers is on the order of 100-1000.

In the container 40, the short staple reinforcing fibers 38 are dried at 50°-250° C., and preferably between 80°-150° C., by a hot air dryer, shown schematically at 42, or by such other device known to those skilled in the art which will produce the desired drying effect.

Preferably, the treated short staple reinforcing fibers 38 are mixed with the rubber matrix in the amount of 5-50 weight parts, and preferably from 10-30 weight parts, per 100 parts of the matrix rubber. The mixed rubber matrix and fibers 38 are kneaded at a station 44 in the system 10 so that the fibers 38 are uniformly dispersed.

The preferred form of rubber latex used for treating the short staple reinforcing fibers, according to the invention, is preferably one of, or a mixture of, styrene-butadiene copolymer rubber latex, natural rubber latex, vinylpyridine-styrene-butadiene-terpolymer latex, nitrilebutadiene latex, chloroprene latex, and the like.

The rubber in the rubber paste, according to the present invention, preferably is one of, or a mixture of, natural rubber, chloroprene rubber, styrene-butadiene copolymer rubber, acrylonitrile-butadiene copolymer rubber, polysulfide rubber, isobutylene polymer rubber, alkylacrylate-chloroalkylvinyl-ether copolymer rubber, chlorosulfonated polyolefin rubber, and the like.

The rubber paste is made by using a solvent on the rubber, which solvent preferably is at least one of toluene, xylene, methylethylketone, and the like.

Following are experimental results which demonstrate the effectiveness of the present invention.

FIBER DISPERSION TEST

Test Sample A

A filament yarn of 30,000 denier (2 denier X 15,000) of methaphenyleneiso-phthalamide fiber (Cornex) was dipped in an aqueous dispersion of high saturation polymer rubber latex, containing a nitrile radical of 120 or less of iodine value (hereinafter referred to as "hydrogenated nitryl rubber latex" (H-NBR latex) having 40% solid content, currently manufactured by Nippon Zeon Co., Ltd.) to produce 20 weight percent of solid concentration, then operated on by squeeze rollers so that the adhering amount of rubber latex solid was approximately 5 weight percent with respect to the weight of the fibers, and cut by a guillotine-type cutter into short staple fibers of approximately 3 mm in length. The cut fibers were dried at 150° C. in a hot blast dryer until the water content was approximately 1-5%. The short staple reinforcing fibers, coated with H-NBR, were mixed at 15 volume % with the rubber matrix compound A (in the following Table 1) in a BR-type Banbury mixer to obtain a rubber composite material in which the filament short staple reinforcing fibers were dispersed in the rubber.

TABLE 1

| Mixing Chemicals | Mixing Ratio A (PHR) |
| --- | --- |
| Z pole 2020 | 100 |
| Zinc oxide | 5 |
| Stearic acid | 1 |
| Oil | 5 |
| Carbon black | 40 |
| Antioxidant (3C) | 2 |
| Accelerator (TT) | 1.5 |
| Accelerator (CZ) | 1 |
| Sulfur | 0.5 |

The rubber composite material of Test Sample A was compressed by 12" rolls to a sheet having a 1 mm thickness to arrange the short staple reinforcing fibers in the direction of rolling. The four rubber sheets were adhered so that the lengths of the reinforcing fibers were aligned in all sheets. The sheets were then cut to a predetermined length in a direction perpendicular to the rolling direction.

Figure 2:
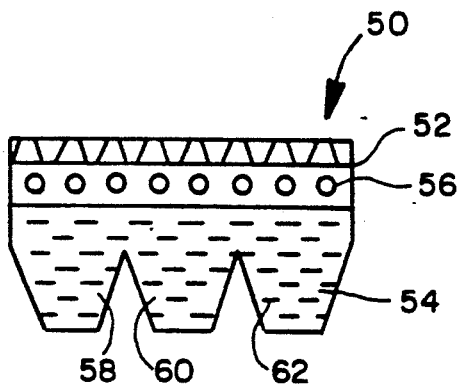
FIG. 2 is a cross-sectional view of a V-ribbed power transmission belt with a compression section having a composite material according to the present invention incorporated therein.

The resulting composite material was then used to construct a V-ribbed belt, as shown at 50 in FIG. 2. The belt 50 consists of a tension section 52, a compression section 54, and a load-carrying section 56. The compression section 54 was cut to define a plurality of longitudinally extending ribs 58,60,62. The ribs 58,60,62 define what is referred to as a "K shape" with a peripheral outer length of 1,280 mm. This particular belt configuration is identified in the industry as a 3PK1280 type belt.

Test Sample B

For a comparison belt, untreated, cut yarns of methaphenyleneiso-phthalamide (Cornex) fiber, having the same thickness and length as those of the treated cut yarns of Test Sample A, were mixed at 15 volume % with the rubber matrix compound A of Table 1 to be dispersed in the rubber matrix material. The composite material was used, as with test Sample A, to form 3PK1280 V-ribbed belts.

Figure 4:
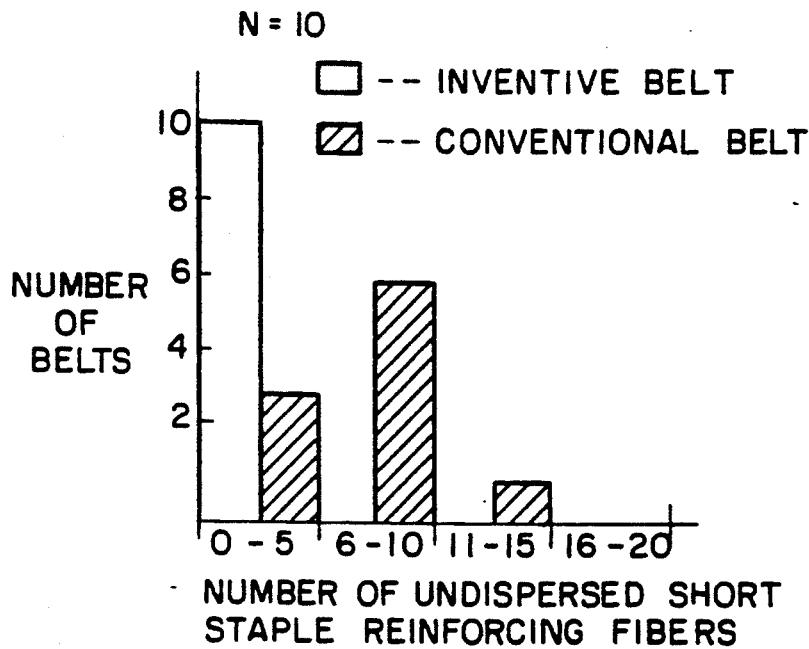
FIG. 4 is a graph comparing the number of undispersed, short staple reinforcing fibers in conventionally manufactured belts versus belts made according to the present invention.

Ten of the above-described belts (the 3PK1280) were selected at random. The ribs of the belts were visually observed to check the number of lumps of short staple reinforcing fibers having a diameter of at least 0.5 mm. The results are shown in FIG. 4.

It can be seen that the number of lumps of short staple reinforcing fibers in belts made according to the present invention is dramatically reduced over belts made by conventional techniques, demonstrating the excellent dispersion of fibers realized through practice of the present invention.

Belt Durability Test

Figure 3:
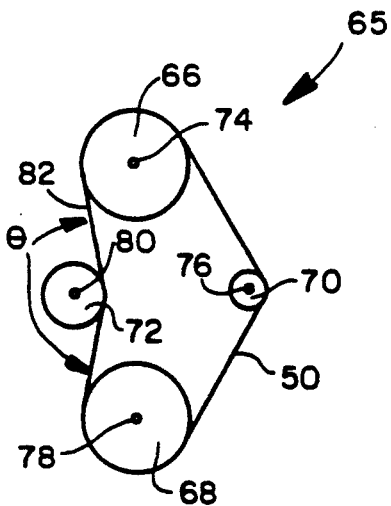
FIG. 3 is a schematic, side elevation view of a machine for testing durability of a power transmission belt in a dynamic environment.

The above 3PK1280 belt sample was engaged in a reverse bending 4-shaft feeding testing machine, shown at 65 in FIG. 3. The machine 65 has a drive pulley 66, a driven pulley 68, a tensioning pulley 70 and an idler pulley 72. The pulleys 66,68,70,72 are all arranged to be rotatable about parallel axes 74,76,78,80, respectively. The drive pulley 66 had a diameter of 120 mm and was rotated at 4,900 rpm. The driven pulley 68 had a 120 mm diameter and was loaded to 12 ps. The tensioning pulley 70 had a diameter of 45 mm. The idler pulley 72 had a dimension of 85 millimeters. The idler pulley 72 was pressed against the back side 82 of the test belts 50 with sufficient force to produce a winding angle Θ of 120°.

Figure 5:
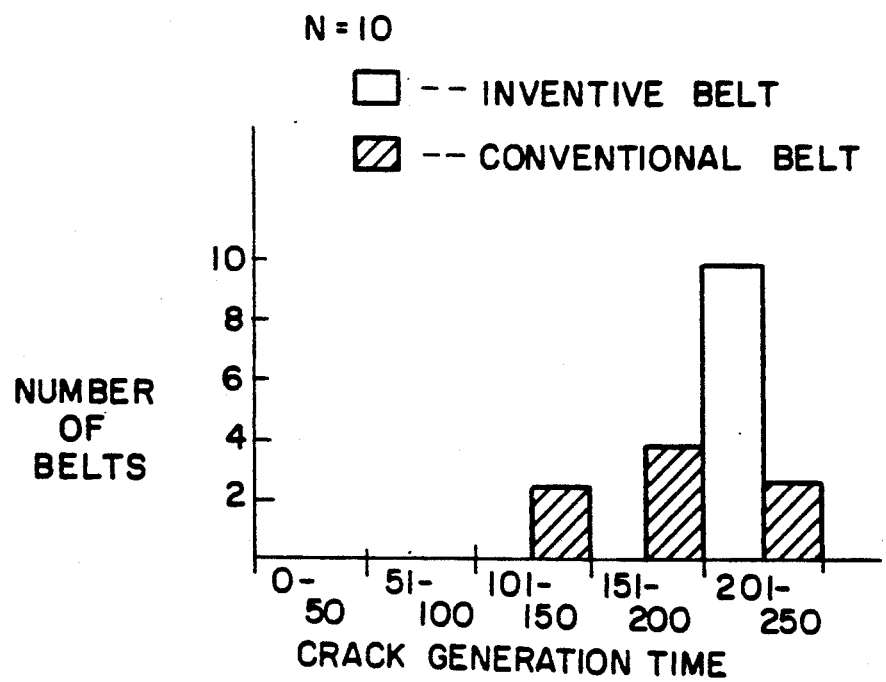
FIG. 5 is a graph comparing the crack generation time of conventional belts and belts made according to the present invention as tested on the machine of FIG. 3.

The system was operated until the bottom of the belts cracked at 120° C. with an initial belt tension of 30 kg. The results of the test are shown in FIG. 5.

The inventive belts ran considerably longer than conventional belts before cracking occurred. The performance of the conventional belts in terms of durability was erratic compared to the inventive belt.

The foregoing disclosure of specific embodiments is intended to be illustrative of the broad concepts comprehended by the invention.

I claim:

1. A rubber composite material comprising:
   a rubber matrix material; and
   a plurality of short staple reinforcing fibers of methaphenyleneiso-phthalamide dispersed in the rubber matrix material, the fibers having an irregular surface,
   wherein the reinforcing fibers are coated with one of a rubber latex and a rubber paste.

2. The rubber composite material of claim 1 wherein the one of the rubber latex and rubber paste is made from the same rubber as the rubber matrix material.

3. The rubber composite material of claim 1 wherein the one of the rubber latex and rubber paste is made from a different rubber than that of the rubber matrix material.

4. The rubber composite material of claim 1 wherein the one of the rubber latex and rubber paste coated on the reinforcing fibers is provided in an amount from 1-10 weight % with respect to the amount of reinforcing fibers.

5. The rubber composite material of claim 1 wherein the rubber latex is at least one of styrenebutadiene copolymer rubber latex, natural rubber latex, vinylpyridine-styrene-butadiene-terpolymer latex, nitrilebutadiene latex, and chloroprene latex.

6. The rubber composite material of claim 1 wherein the reinforcing fibers are present in the amount of 5-50 parts per 100 parts by weight of the rubber matrix material.

7. The rubber composite material of claim 1 wherein the reinforcing fibers are present in the amount of 10-30 parts per 100 parts by weight of the rubber matrix material.

8. The rubber composite material of claim 1 wherein the rubber paste comprises at least one of natural rubber, choloroprene rubber, styrene-butadiene copolymer rubber, acrylonitrile-butadiene copolymer rubber, polysulfide rubber, isobutylene polymer rubber, alkylacrylate-chloroalkylvinyl-ether copolymer rubber, and chlorosulfonated polyolefin rubber.

9. The rubber composite material of claim 8 wherein the rubber paste is made by mixing rubber with a solvent that is at least one of toluene, xylene, and methylethylketone.

10. A rubber composite material comprising:
    a rubber matrix material; and
    a plurality of short, staple, irregularly surfaced reinforcing fibers of methaphenyleneiso-phthalamide dispersed in the rubber matrix material, wherein the reinforcing fibers are coated with one of a rubber latex and a rubber paste.

11. An improved power transmission belt of the type having a tension section, a compression section and a load carrying section, the improvement wherein:
    at least part of the compression section is defined by a rubber matrix material having a plurality of short staple reinforcing fibers of methaphenyleneiso-phthalamide dispersed in the matrix material, the fibers having an irregular surface,
    wherein the reinforcing fibers are coated with one of a rubber latex and a rubber paste.

12. The improved power transmission belt according to claim 11, wherein the one of the rubber latex and rubber paste is made from the same rubber as that of the rubber matrix material.

13. The improved power transmission belt according to claim 11 wherein the one of the rubber latex and rubber paste is made from a different rubber than that of the rubber matrix material.

14. The improved power transmission belt according to claim 11 wherein the one of the rubber latex and rubber paste coated on the reinforcing fibers is provided in an amount from 1-10 weight % with respect to the amount of reinforcing fibers.

15. A method of manufacturing a rubber composite material comprising the steps of:
    coating reinforcing fibers of methaphenyleneisophthalamide with at least one of rubber latex and rubber paste, the fibers having an irregular surface; and
    mixing the coated reinforcing fibers in a rubber matrix material.

16. The method of manufacturing a rubber composite material according to claim 15 wherein the reinforcing fibers are coated by dipping the reinforcing fibers in at least one of rubber latex and rubber paste.

17. The method of manufacturing, a rubber composite material according to claim 16, including the step of drying the one of the rubber latex and rubber paste on the coated reinforcing fibers before mixing the reinforcing fibers in the rubber matrix material.

18. The method of manufacturing a rubber composite material according to claim 16 including the step of controlling the amount of the at least one of the rubber latex and rubber paste on the reinforcing fibers after the reinforcing fibers are dipped in the at least one of the rubber latex and rubber paste.

19. The method of manufacturing a rubber composite material according to claim 18 wherein the amount of the at least one of the rubber latex and rubber paste is controlled to be present in an amount of 1-10 weight % with respect to the amount of reinforcing fibers.

20. The method of manufacturing a rubber composite material according to claim 15 including the steps of providing a first predetermined length of metaphenyleneiso-phthalamide reinforcing fiber, coating the first length of reinforcing fiber and cutting the first length of reinforcing fiber after coating into a plurality of short staple reinforcing fibers.

21. The method of manufacturing a rubber composite material according to claim 20 wherein the short staple reinforcing fibers have a length of 1-50 mm.

22. A method of manufacturing a rubber composite material comprising the steps of:
    providing a fiber of metaphenyleneisophthalamide having a first predetermined length, the fiber having an irregular surface;
    dipping the first length of fiber in at least one of a rubber latex and rubber paste;
    controlling the amount of the one of the rubber latex and rubber paste on the first fiber length;
    cutting the first fiber length into a plurality of short staple reinforcing fibers;

drying the short staple reinforcing fibers; and
mixing the dried short staple reinforcing fibers in a rubber matrix material.

23. The method of manufacturing a rubber composite material according to claim 22 wherein the controlling step comprises the step of compressing the fiber length with the one of the rubber latex and rubber paste thereon between a cooperating pair of rollers.

24. The method of manufacturing a rubber composite material according to claim 22 including the step of incorporating the matrix material with the short staple reinforcing fibers therein into a power transmission belt.

25. The method of manufacturing a rubber composite material according to claim 22 wherein the one of the rubber latex and rubber paste and the matrix material are the same material.

26. The method of manufacturing a rubber composite material according to claim 22 wherein the one of the rubber latex and rubber paste and the matrix material are different materials.

27. The method of manufacturing a rubber composite material according to claim 22 including the step of controlling the amount of the one of the rubber latex and rubber paste to be from 1-10 weight percent with respect to the amount of short staple reinforcing fibers.

* * * * *